United States Patent [19]

Kempf

[11] Patent Number: 4,474,637
[45] Date of Patent: Oct. 2, 1984

[54] LABELING MACHINE AND LABEL

[75] Inventor: Thomas Kempf, Wuppertal, Fed. Rep. of Germany

[73] Assignee: Otto Brand GmbH, Wuppertal, Fed. Rep. of Germany

[21] Appl. No.: 276,900

[22] Filed: Jun. 24, 1981

[30] Foreign Application Priority Data

Jun. 27, 1980 [DE] Fed. Rep. of Germany ....... 3024138
Sep. 26, 1980 [DE] Fed. Rep. of Germany ... 8025802[U]

[51] Int. Cl.³ .......................... C09J 5/02; B29C 17/00; B32B 31/16; D06C 15/00
[52] U.S. Cl. ................................ 156/380.5; 156/73.4; 156/475; 156/580.2; 223/57
[58] Field of Search ............... 156/73.1, 73.5, 73.8, 156/380, 380.1, 73.4, 380.5, 475, 580.2; 219/80, 78.16, 87, 86.24, 91.23, 148; 223/3, 30, 28, 57, 34, 35; 380.2/204, 226, 227, 492, 474, 380.5

[56] References Cited

U.S. PATENT DOCUMENTS

| 3,666,602 | 5/1972 | Obeda | 156/73.4 |
| 3,982,978 | 9/1976 | Carpenter | 156/73.4 |
| 4,083,737 | 4/1978 | Foote, Jr. et al. | 156/580.1 |
| 4,159,220 | 6/1979 | Bosche et al. | 156/580.1 |
| 4,187,768 | 2/1980 | Suzuki | 156/73.1 |

FOREIGN PATENT DOCUMENTS

| 555213 | 4/1958 | Canada | 156/380.5 |
| 2650266 | 5/1977 | Fed. Rep. of Germany. | |
| 2428514 | 2/1980 | France | 156/73.1 |
| WO80/01775 | 9/1980 | PCT Int'l Appl. | 156/73.1 |

Primary Examiner—Edward Kimlin
Assistant Examiner—Louis Falasco
Attorney, Agent, or Firm—Watson, Cole, Grindle & Watson

[57] ABSTRACT

The invention relates to a machine for making labels of textile material sealable by ultrasonic means and having a delivery section that operates in cycles, and a folding and ironing device for gripping, folding, and ironing the labels which are delivered one behind the other. In order to substantially improve the handling of the labels as they are being sewn in, there is provided after the folding device an ultrasonic sealing device for affixing to the backs of the labels creased folds thereof by means of a fused joint.

The invention further relates to a label from textile material for tape sealable by ultrasonic means and having at least one fold creased onto the back thereof, the creased fold being connected to the label across an ultrasonically fused joint, as well as a label with or without a creased fold, the ultrasonically fused joint being formed as a detach-by-ripping fused joint extending across the entire width of the label.

6 Claims, 8 Drawing Figures

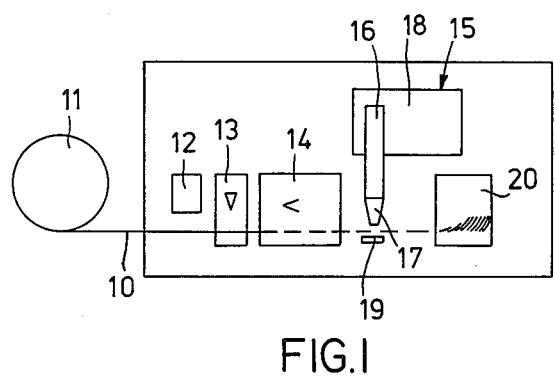
FIG.1
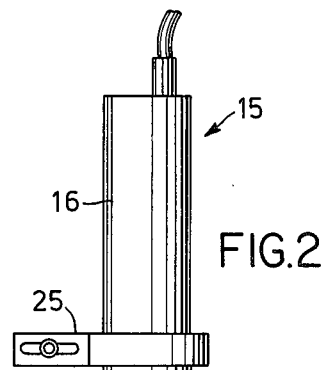
FIG.2
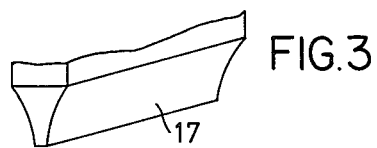
FIG.3
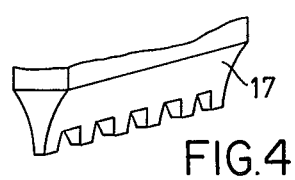
FIG.4
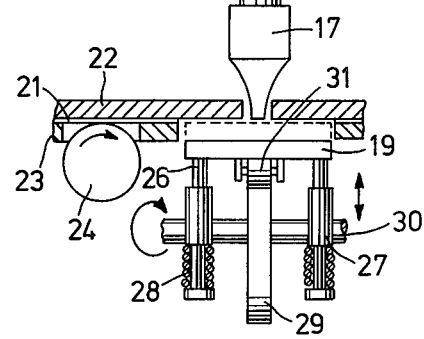
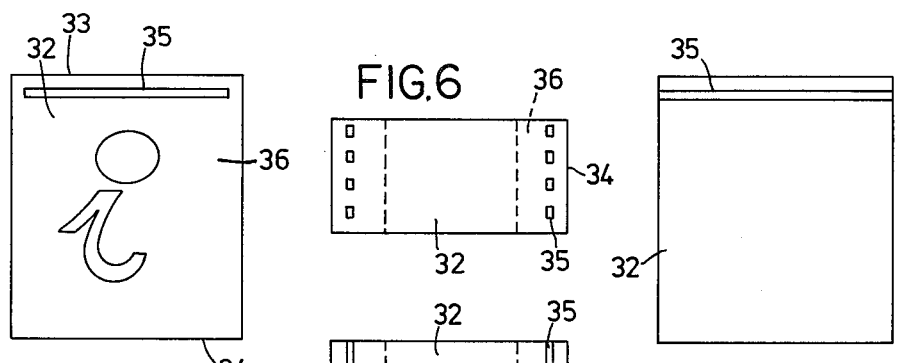
FIG.5
FIG.6
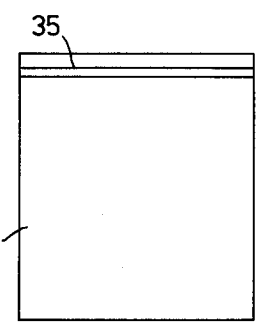
FIG.7
FIG.8

LABELING MACHINE AND LABEL

BACKGROUND OF THE INVENTION

The invention relates to a machine for making labels from textile material which have been folded to provide a main portion and a fold portion, and wherein the fold portion is then ironed against the main portion.

SUMMARY OF THE INVENTION

In labeling machines of known construction, the label material, usually in the form of a tape, is drawn off by means of a reel and fed to a delivery section operating in cycles and on which a cutting blade is mounted to cut off the labels from the tape, controlled by a photoelectric scanner. The cut-off labels, delivered one behind the other on the delivery section, are fed to a folding/ironing device where they are seized, provided with one or more folds which are creased onto the back of the label, and subsequently ironed. The ironed labels are then fed to a stacking unit where they are piled up in containers. Such machines are, for instance, produced and marketed by Horst Kind GmbH, a textile machine factory at 5600 Wuppertal-Barmen, Federal Republic of Germany, or by Forthmann Label Services Ltd., West Woods, New Jersey, U.S.A.

However, in labels produced with this type of machines with folds that are creased onto the backs thereof, the handling of the labels during the sewing, e.g., into garments, is time-consuming, because the folds, creased onto the back, tend to spread apart from the labels and sometimes, even during the piling in the stacking unit, they have been turned down, thus making the sew-in even more difficult.

The primary object of the invention is to provide a labeling machine of the kind described in the introduction, which permits the production of labels that can readily be seized, layed on the material to which they are to be sewed, and then sewed thereto without requiring time-consuming operations.

This object is achieved by providing after the folding device an ultrasonic sealing device affixing the folds, creased by means of a folding device onto the backs thereof, to the labels by means of an ultrasonically fused joint.

In this way, labels can be made in which in extremely simple fashion and without interfering with the machine cycle, the folds, creased onto the back, are attached. This prevents the folds, creased onto the back, from bending away during the further processing, or due to the action of air humidity, or already as they are being piled on the stacking unit. Due to the high quality of the labels achieved, in which the creased folds are connected with the label by means of an ultrasonically fused joint, considerable sewing time can be saved, because it dispenses with the sorting out of defective labels and the readying of the labels in the form required for the sew-in.

Suitable as materials for ultrasonic sealing are, e.g., artificial silk, acetate, or all types of polymer materials; and the labels may be printed or woven.

The ultrasonic sealing device may have a sealing head that may be mounted with allowance for vertical and horizontal adjustment, while the sealing time can be adjusted by means of an ultrasonic generator in accordance with the label material (composition and thickness). Preferably, an anvil is used which reciprocates with respect to the sealing head of the ultrasonic sealing device in accordance with the machine cycle. The ultrasonic sealing device may be arranged directly ahead of the stacking unit, but preferably behind the folding device in the area of the ironing device, particularly since the latter, which usually consists of a number of ironing stations, has moving ironing plates that can be extended so as to form the anvil for the sealing head of the ultrasonic sealing device.

Preferably, the ultrasonic sealing device is adjusted in such a way that it produces a fused joint that can be detached by ripping and that extends across the entire width of the label because often, when at the end of a fashion season partial collections of an apparel manufacturer have remained unsold and these garments must be sold at lower prices, but not through a dealer, it is necessary to remove and replace these labels that identify the manufacturer. To be able to do this simply and without excessive outlays of time and money, the detach-by-ripping fused joint makes it possible to tear the sewn-in label out of the garment by ripping it off at the fused joint so that only the sewn-in edges remain on the garment and can be covered by the new label.

Labels with creased folds further have the advantage that the folds, creased onto the back, cannot bend away during subsequent operations and they cannot be turned down during the processing already.

Furthermore, the detach-by-ripping fused joint can be layed so far from the label edge to be stitched that a sufficiently large section of the label remains in the garment after being torn off to which the new label, in turn, can be stitched.

DESCRIPTION OF THE DRAWINGS

The invention will now be described with reference to the accompanying schematic drawings, in which:

FIG. 1 is a schematic diagram of a labeling machine;

FIG. 2 shows one type of ultrasonic sealing station for the machine shown in FIG. 1.

FIGS. 3 and 4 show two types of sonotrode for producing an ultrasonically fused joint; and FIGS. 5-7 show various types of labels.

DETAILED DESCRIPTION OF THE PREFERRED EMBODIMENTS

In the labeling machine of FIG. 1, the tape material 10 for labels is unwound from a roller 11 and fed to a delivery section that works in cycles, the reel-off occurring in accordance with the machine cycle and being controlled by means of microswitches (not shown) over an adjusted tape pre-travel. The tape material 10, which advances along the delivery section, first passes underneath a photoelectric scanner 12, which is adjusted to a predetermined point of the passing labels of tape material 10 and controls a following cutoff device 13 with a (e.g., hot) cutting blade, so that the labels are cut off therein in accordance with the repeat at the desired point from the tape material 10. The cut-off labels are fed to a following folding and ironing device 14, where the still unfolded label is taken over by a gripping device and is folded and ironed as required so as to obtain exact folding edges.

The folded labels pass in accordance with the machine cycle through an ultrasonic sealing device 15 comprising a sound head 16 with a sonotrode 17 and an ultrasonic generator 18, as well as an anvil 19 which moves back and forth with respect to the sonotrode 17. The folds, creased onto the back of the labels, are preferably layed after the folding in the area of the ironing device.

After the ultrasonically fused joints have been put in place, the completed labels are fed to a stacking unit 20, where they are piled up and delivered.

Since this type of labeling machine, aside from the ultrasonic sealing device 15 that embodies the principles of the present invention, is of known construction, it need not be discussed in further detail.

As apparent from FIG. 2, the cut-off and creased labels are conveyed through a guide duct 21 mounted between two guide plates 22, 23 to the area of the ultrasonic sealing device 15. This is accomplished, for example, by means of feed rollers 24 which project into the area of the delivery duct 21 through recesses in the lower guide plate 23. The sonotrode 17 projects through a gap in the guide plate 22 into the area of the delivery section for the labels. The sound head 16 of the ultrasonic sealing device 15 is firmly secured to the machine frame (not shown), e.g., by means of a clamp 25. The lower guide plate 23 has a recess in which the anvil 19 is mounted with allowance for upward and downward motion with respect to the sonotrode 17.

In the practical embodiment shown, the anvil 19 is provided with two vertical guide bars 26 which are arranged in cylinder liners 27 mounted on the machine frame, a compression spring 28 being inserted between the free end of the guide bars 26 and the cylindrical liners 27. In this way, the anvil 19 is biased away from the sonotrode 17. The anvil 19 is moved upward and downward by means of a cam disk 29 fastened to a shaft 30, a roller 31, which coacts with the cam disk 29, being mounted to the back of the anvil 19. In this way, a label that has been advanced is pressed against the sonotrode 17 by means of the anvil 19 in accordance with the machine cycle upon reaching the position provided, resulting in the creation of the desired fused joint.

The ultrasonic sealing device 15 can work intermittently or continuously, since the fused joint can only be layed when the label is pressed in between the anvil 18 and the sonotrode 17.

In the practical embodiment shown, the form of the sonotrode 17 determines at its lower end the form of the fused joint, which can be continuous or punctiform, depending on whether a fusion face according to FIG. 3 or FIG. 4 is used. As shown in the figures, the anvil 19 may be constructed with a large surface, but it may also have the form of the desired fused joint. In the latter case, it is possible to design the sonotrode 17 with a larger surface, but it may also be formed as an exact complement to the anvil 19.

The label 32 shown in FIG. 5 is one that has to be sewn, for example, into a garment along the upper edge 33 thereof. Its front shows the references to the manufacturer, while the back fold (not shown), creased about the folding edge 34, may have information, e.g., about the composition and treatment of the garment into which the label 32 shall be sewn in. The superposed sections of the label 32 joined together over the folding edge 34 are linked together in the area of the upper edge 33 by means of an ultrasonically fused joint 35. In the case illustrated in FIG. 5, the fused joint 35 consists of a continuous fused joint which forms a linear depression on the top of the label 32. However, the fused joint 35 may also consist of a sufficient number of individual points in order to join together the creased folds 36 of a label 32, as shown in FIG. 6, at the site where the latter has two folds 36 creased onto its back. As apparent from FIG. 6, both ends of the label 32 are creased rearward, each of the two folds 36 being affixed to the label 32 by a punctiform fused joint 35. Such a fused joint can be made by means of a sonotrode 17 (FIG. 4). In the label of FIG. 7, the ultrasonically fused joint 35 can be detached by ripping and extends across the width of the label 12, which in other respect corresponds to that shown in FIG. 5.

The label 32 of FIG. 8 corresponds to that of FIG. 6, aside from the fact that the ultrasonically fused joint 35 extends across the width of the label 32 and is formed as a detach-by-ripping fused joint.

The labels 32 with detach-by-ripping fused joints 35 shall be placed so far from the adjacent edge that the actual joint to be layed during the sew-in of the labels can be inserted between the fused joint 35 and the adjacent edge of the label 32, so that the label can be readily torn out, with the edges affixed with yarn between the fused joint 35 and the adjacent edge of the label remaining in the garment.

I claim:

1. In a machine for making folded labels from textile material which includes a label delivery means and a label folding and ironing means, said label delivery means being cyclically operable to sequentially deliver labels to said label folding and ironing means and said label folding and ironing means being operable to first fold each label delivered thereto, so as to provide it with a main portion and at least one folded over fold portion, and to then iron each so-folded label, the improvement wherein said machine also includes an ultrasonic sealing means to which each said folded and ironed label is passed, said ultrasonic sealing means including a sonotrode for contacting each folded and ironed label, a sound head mounting the sonotrode and an ultrasonic generator connected to the sound head, said ultrasonic generator operating said sound head such that the sonotrode connected thereto will cause each fold portion of each folded and ironed label which it contacts to be ultrasonically sealed at a joint to the main portion and for the joint itself to be manually rippable.

2. In the machine as defined in claim 1 wherein said sonotrode has a head and wherein said ultrasonic sealing means further includes an anvil which is reciprocatingly movable towards the head of said sonotrode as said folded and ironed labels are passed therebetween.

3. In the machine as defined in claim 2 wherein the head of said sonotrode is elongated and has a continuous label-engaging surface.

4. In the machine as defined in claim 2 wherein the head of said sonotrode is elongated and has a discontinuous label-engaging surface.

5. In the machine as defined in claim 4 wherein the head of said sonotrode has a teeth-like label-engaging surface.

6. In the machine as defined in claim 2 wherein support means are connected to said anvil to movably bias said anvil away from the head of said sonotrode and wherein actuator means are connected to said anvil to move it towards the head of said sonotrode.

* * * * *